United States Patent [19]

Pagels et al.

[11] 4,337,025
[45] Jun. 29, 1982

[54] APPARATUS FOR MOLDING A CONTAINER WITH OFFSET PARTING LINE

[75] Inventors: Louis T. Pagels, Hanover Park; Dieter H. Nagel, Des Plaines, both of Ill.

[73] Assignee: Automatic Liquid Packaging, Inc., Arlington Heights, Ill.

[21] Appl. No.: 180,961

[22] Filed: Aug. 25, 1980

[51] Int. Cl.³ .............................................. B29C 17/07
[52] U.S. Cl. ..................................... 425/392; 264/523; 264/525; 264/540; 425/182; 425/195; 425/524; 425/525
[58] Field of Search ............... 425/182, 195, 522, 524, 425/525, 532, 392; 264/523, 524, 525, 531, 533, 534, 540; 215/1 C

[56] References Cited

U.S. PATENT DOCUMENTS

| | | | |
|---|---|---|---|
| 3,423,495 | 1/1969 | Bachner | 264/525 X |
| 4,082,827 | 4/1978 | Chlyston | 425/525 X |

FOREIGN PATENT DOCUMENTS

| | | | |
|---|---|---|---|
| 764648 | 9/1971 | Belgium | 264/525 |
| 2347528 | 11/1974 | Fed. Rep. of Germany | 264/540 |
| 1150795 | 4/1969 | United Kingdom | 264/540 |

*Primary Examiner*—Jan H. Silbaugh
*Attorney, Agent, or Firm*—Dressler, Goldsmith, Shore, Sutker & Milnamow, Ltd.

[57] ABSTRACT

A mold assembly is provided for making a thermoplastic container having a bottom, side and unitary closure or top wall means with a parting line along a plane of symmetry in the bottom and sidewall means but with the parting line offset on the top wall means to define a generally flat, pierceable membrane on a major portion of the exterior surface of the top wall means. The mold assembly molds and seals the container from a tube of thermoplastic material, which assembly includes mold parts having lower sections adapted to open and close relative to a center parting plane to shape the bottom and sidewall means of the container and having a pair of upper sections adapted to shape the unitary closure. One of the upper sections has a removable protuberance for forming a major portion of the container top closure surface with the mold parting line thereon offset relative to the center parting plane of the mold assembly.

4 Claims, 6 Drawing Figures

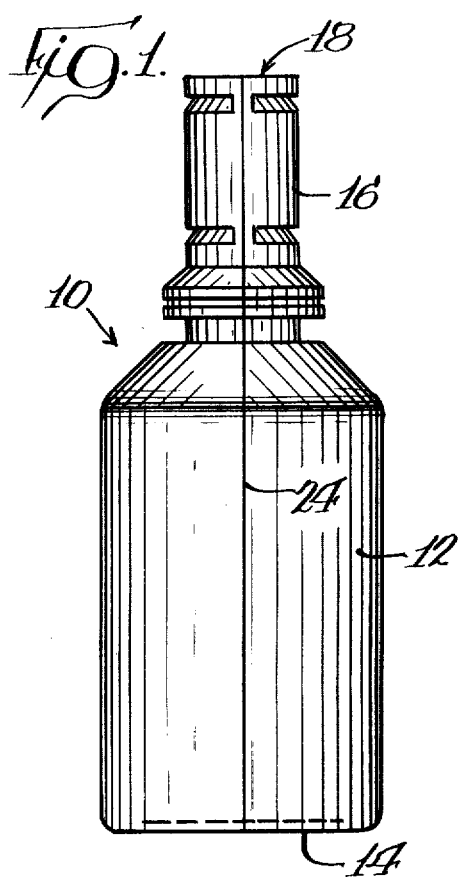
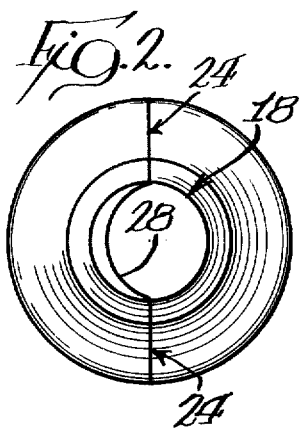
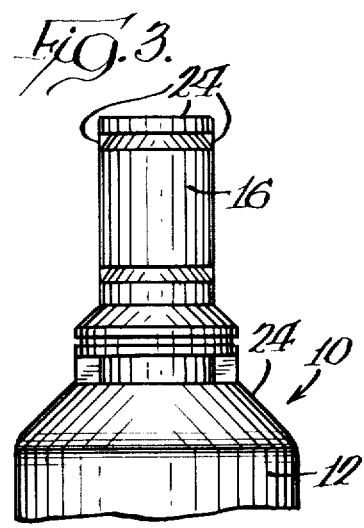
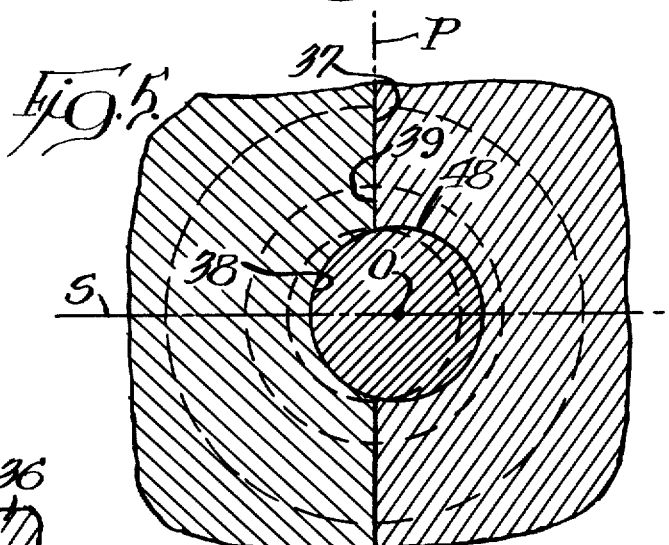
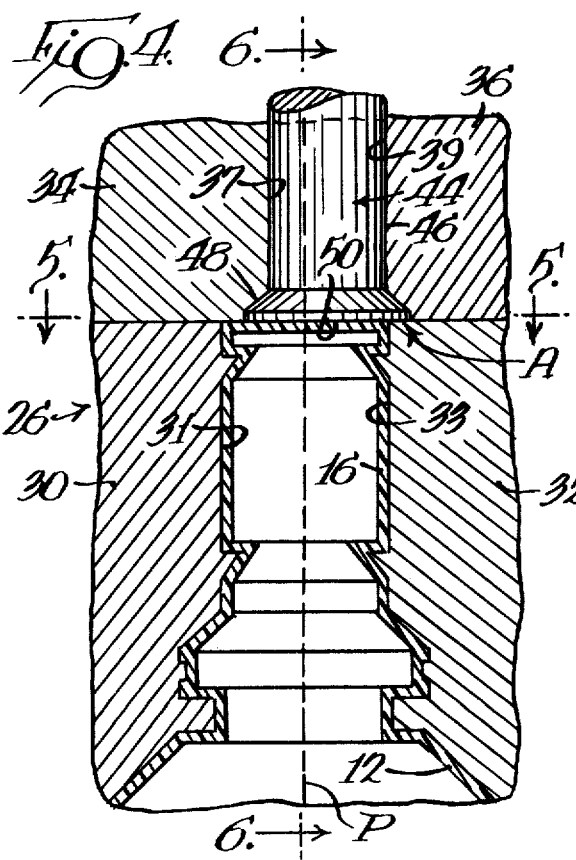
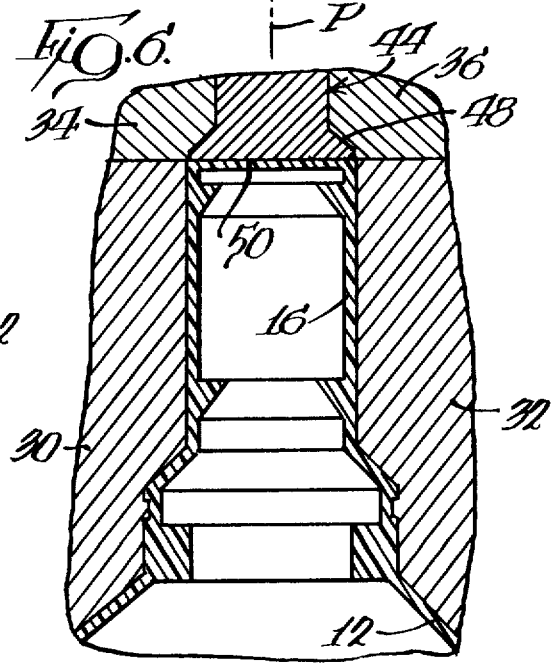

APPARATUS FOR MOLDING A CONTAINER WITH OFFSET PARTING LINE

DESCRIPTION

BACKGROUND OF THE INVENTION

This invention is directed to apparatus for the fabrication of a unitary dispensing container.

Packaging systems that blow mold, fill and seal containers such as bottles, bags and the like, enjoy widespread commercial acceptance because of ease of operation and reduced labor cost. Moreover, such a packaging system obviates the need for costly auxiliary equipment that cleans and handles empty containers, fills the containers, and subsequently seals the filled containers. A packaging system of the foregoing type is disclosed in U.S. Pat. No. Re. 27,155 to Hansen.

Since the complete filling cycle for a container takes place in an enclosed environment when the aforementioned form, fill and seal packaging system is employed, this system is well suited for sterile and aseptic packaging of parenteral solutions and the like substances. However, for such solutions it is desirable to provide a container having a pierceable closure portion of controlled dimensions that can be readily penetrated by and receive a cannula without undesirable coring and leaking when it is desired to drain the container contents.

Typical prior art containers for this purpose have a base portion for supporting the container on a flat surface and a pierceable cannula-receiving closure portion, displaced from, and usually opposite, the base portion. Typically, the cannula-receiving portion includes a generally flat, pierceable region which is unitary with the container itself and which serves to close the container after the container has been filled with a desired contents.

With prior art containers of the type described above, a mold parting line occasioned by the mold parts needed to shape the container, traverses the top pierceable region. The parting line is usually manifested by an outwardly projecting bridge of molded material which is formed by the partial flow of the molded material between the mold parts as the container is fabricated.

However, this ridge interferes with the penetration of the pierceable region by the cannula when a container is pierced, and in some containers the parting line is the pierceable region has been offset by appropriate contouring of the molds for fabricating the container.

It would be desirable to provide apparatus for making a small container having an offset parting line in the pierceable region thereof using efficient split mold techniques.

SUMMARY OF THE INVENTION

The present invention contemplates an apparatus for the fabrication of a unitary, hermetically sealed but pierceable container that is eminently suitable for containing parenteral solutions and which has a flat, pierceable closure region substantially free from a ridge or the like that may interfere with the penetration of this region by the cannula. The apparatus is specifically adapted to permit the use of conventional blow molding techniques utilizing split mold technology and is relatively easy to maintain.

According to the present invention, a mold assembly is provided and includes a set of lower mold sections adapted to shape the body of the container, and a set of specially designed upper mold sections adapted to shape a pierceable unitary closure for the container. At least one of the mold sections includes a removable element that defines a portion of the mold cavity contour. The mold sections are movable between an open and closed position relative to a central parting plane for the mold that is defined by configurations of principal mold faces to said mold sections when the mold sections are in the closed position. The lower mold sections together define a container body mold cavity that is oriented substantially symmetrically about the centered parting plane when the mold sections are in the closed position.

A region in each of the upper mold sections provides a mold surface facing the container body mold cavity. Both of these regions together define the top of the container mold cavity which is instrumental in forming the container top closure surface. However, the mating of the upper mold sections when the upper mold sections are closed causes the mold parting line thereon to be offset relative to the central parting plane. Owing to the offset of the parting line, a major portion of the top surface of the container is defined between the container periphery and the parting line. This major portion of the top surface thus presents a flat pierceable surface to the cannula.

The combined effect of the various elements associated in accordance with the present invention is greater than the sum of the several effects of those elements taken separately. The novel combination of elements in accordance with the present invention yields desirable, beneficial and synergistic results—results which are not only unusual and surprising, but also provide a substantial improvement over the prior art.

Numerous other advantages and features of the present invention will become readily apparent from the following detailed description of the invention and of one embodiment thereof, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a side elevational view of the container which is made by the mold assembly of the present invention;

FIG. 2 is a top view of the container shown in FIG. 1;

FIG. 3 is a fragmentary view of the top portion of the container shown in FIG. 1, but with the container rotated 90 degrees;

FIG. 4 is a partial, fragmentary, cross-sectional view of the mold assembly of the present invention shown molding the top portion of the container (oriented as illustrated in FIG. 1);

FIG. 5 is a cross-sectional view taken along the plane 5—5 in FIG. 4; and

FIG. 6 is a partial, fragmentary cross-sectional view taken along the plane 6—6 of FIG. 4.

DESCRIPTION OF THE PREFERRED EMBODIMENT

While this invention is susceptible to embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated.

For ease of description, the apparatus of this invention will be described in a normal operating or use position, and terms such as upper, lower, horizontal, etc., will be used with reference to this normal operating position. It will be understood, however, that the apparatus of this invention may be manufactured, stored, transported and sold in an orientation other than the normal operating or use position described.

A filled and hermetically sealed container, formed by the mold assembly of the present invention, is illustrated in FIG. 1 and designated therein generally by numeral 10. The container 10 is flexible, of unitary construction, and is preferably blow molded from thermoplastic material.

The container 10 has a flexible, generally tubular body 12 closed at one end to form a base 14 and terminates at the other end by means of a hollow neck 16 having a generally flat pierceable top closure or membrane 18 adapted to receive a syringe or cannula.

The neck 16 has a generally right cylindrical configuration with the distal end thereof terminating in, or defined by, the pierceable membrane 18. Consequently, in the embodiment illustrated, the membrane 18 has a circular shape.

It is through membrane 10 that the contents of the container 10 are removed. The membrane 18 may be penetrated by a draining cannula, spike, syringe, or other such instrument by piercing the membrane 18, generally perpendicular to the plane of the membrane surface, with the instrument.

The inside diameter or bore of the generally cylindrical neck 16 could be, if desired, adapted for frictional engagement of the draining cannula, spike, syringe or other such instrument after penetration of the membrane 18, and can also be utilized as an annular seal for the instrument received therewithin. The longitudinal dimension of the neck 16 can be selected as required for proper retention of the draining instrument.

Along a central axis or plane of the container 10 is a parting line 24 which is formed during the blow molding of the container 10 along the interface where the coacting mold parts abut in a manner that will be explained in more detail hereinafter. In FIG. 3, the top portion of the container 10 of FIG. 1 is shown in an orientation rotated 90 degrees from the orientation of the container 10 in FIG. 1. Thus, the parting line 24 lies in the plane of the figure.

The parting line 24 is typically manifested by a ridge of material projecting from the otherwise smooth surface of the container 10. The ridge of material forming the parting line 24 results from the partial flow of mold material between the coacting mold parts as the container is formed. The ridge remains after the excess molding material has been removed from the individual container 10 after molding. In some cases, the excess molding material may be subsequently ground down or otherwise removed at the parting line 24 so that no substantial ridge of material projects from the surface of the container 10. In such a case, however, the difference in surface textile is noticeable at the parting line where the material was removed. This difference in texture appears as a discontinuity in the otherwise smooth surface of the container 10.

With respect to FIG. 2, it can be seen that the parting line 24 is displaced or offset where it crosses the membrane 18. The offset portion is designated by numeral 28 which, in the embodiment illustrated, has the shape of an arc of a circle.

Owing to the fact that the parting line 24 has an offset portion 28 in the flat, pierceable membrane 18, a major portion (more than half) of the membrane 18 presents a free, continuous, and smooth surface for receiving the point of the syringe or other instrument used to pierce the membrane 18.

If the parting line 24 continued straight across the diameter of the membrane 18 instead of curving as the portion 28, then the greatest continuous flat surface that would exist on the membrane 18 would comprise a semicircle, one on each side of such a straight parting line. A semicircular surface on the membrane 18 would obviously present less continuous surface area for receiving the point of the syringe when the membrane is pierced. The tip of the syringe would have to be placed to on one side or the other of the parting line on the membrane. If one attempted to place the tip of the syringe in the very center of the membrane 18, the tip would come into contact with the ridge-like formation of the parting line or with other uneven, discontinuous surface structures comprising the parting line. Were the tip of the syringe to be forced downwardly on such a parting line, the tip of the syringe would very likely be deflected by the unevenness of the parting line to one side or the other of the parting line. This may cause the syringe to assume an angled orientation with respect to the longitudinal axis of the container 10 such that, as the syringe is then forced downwardly into the container through the membrane 18, the tip of the syringe may be accidentally forced through the sidewall of the neck 16 or through the sidewall forming the generally tubular body 12. Even in those cases where the operator of the syringe is able to maintain the syringe at a generally perpendicular orientation relative to the top flat surface of the membrane 18, the syringe will have been laterally displaced from the center of the membrane 18 by the parting plane discontinuity. With a relatively small container, the lateral displacement may cause the syringe to enter the generally cylindrical sidewall of the cylindrical neck 16 instead of the hollow cavity within the neck.

The above-described difficulties are overcome with the structure described above wherein the parting line 24 has an offset portion 28 to provide a generally smooth and continuous surface for a major portion of the membrane 18. This assures that there is a smooth surface area large enough to properly receive the syringe as it is pushed through the membrane.

Although the container 10 illustrated in FIGS. 1 and 2 is shown as having a generally upstanding neck 16 and a circular membrane 18, it is to be realized that the container need not have a neck 16 at all. The membrane 18 could be located directly on the end of the tubular body 12. Further, the membrane 18 need not be circular.

The mold assembly of the present invention, described in detail hereinafter, is adapted to provide an offset parting line in a syringe-pierceable closure of a container, regardless of the particular shape of the closure. The membrane 18 can be formed with the mold assembly of the present invention so that it is displaced or offset relative to a central parting plane defined between the principal mold faces of movable opposed mold sections. Further, the membrane 18 can be located on the sides, top, or bottom of a container.

With the novel mold assembly of the present invention, the container 10 can be readily maintained in a sterile condition, and thus pharmaceutical as well as food products can be readily packaged. Any blow-moldable, thermoplastic material compatible with the product to be packaged can be utilized. Typical illustrative thermoplastic material suitable for making the container 10 are the usual blow molding grade materials such as high and low density polyethylene, polypropylene, polycarbonate acetate, acrylonitrile-butadiene-styrene (ABS), and the like.

The container 10 can be molded by the method in which an extruded length or parison of thermoplastic material having a tubular form is surrounded by a relatively movable, sectional mold assembly and in which the walls of the container are formed within the mold by blow molding or vacuum forming techniques. The material to be packaged is introduced into the container after the initial blow molding or vacuum forming of the container walls by a conventional filling tube. The basic techniques and apparatus for effecting such a process are well known in the art, see for Example U.S. Pat. No. Re. 27,155 to Hansen which is incorporated herein by reference. Further described description is deemed superfluous.

A mold assembly in accordance with the present invention is illustrated in FIGS. 4 through 6. The mold assembly is illustrated in operation for forming the container 10 (including the neck 16 and membrane 18) illustrated. The mold assembly includes the portions of the mold adapted to form the tubular body 12 and includes portions adapted to form the membrane across the parting plane in accordance with the present invention. The portions of the mold assembly for forming the lower part of the container and the apparatus for filling the container are conventional and are not illustrated in detail.

The mold assembly includes relatively movable, opposed first and second lower mold sections 30 and 32, respectively. One or both of the lower mold sections are movable toward and away from a parting plane P shown in dashed line in FIG. 4. Each lower mold section 30 and 32 has a principal mold face 31 and 33, respectively (FIG. 5), defining a recess so that when the sections 30 and 32 are moved from a spaced-apart, open position to a closed position with the principal mold faces abutting, the recesses form a cavity adapted to shape the body and neck portions of the container. The parting plane P lies on a longitudinal axis of the container to be molded and, hence, bisects the cavity defined by the recesses in the principal mold faces of the lower mold sections 30 and 32.

The mold assembly also includes relatively movable, opposed, coacting first and second upper mold sections 34 and 36, respectively, for forming the pierceable membrane 18. One or both of the upper mold sections 34 and 36 are movable relative to the center parting plane P between an open position and a closed position. Each upper mold section 34 and 36 has a principal mold face 37 and 39 (FIG. 5), respectively, which are adapted to abut when the mold sections are in the closed position.

Part of the first upper mold section 34 terminates short of the parting plane P above the body cavity defined by the lower mold sections when the mold sections are in closed position to define a recess 38 in the principal mold face 37.

The second upper mold section 36 has a removable protuberance 44 projecting from the principal mold face 39 over the container mold cavity and secured thereto by screws or similar fastening means. The protuberance 44 extends beyond the parting plane P and is received in the recess 38 of the first upper mold section 34 when the mold sections 34 and 36 are in the closed position. The upper mold sections 34 and 36 coact to present an inwardly facing mold surface defining the top of the container mold cavity for forming the container top closure surface or membrane 18 when the mold sections are in the closed position.

In accordance with the present invention, the protuberance 44 is a removable insert comprising a generally cylindrical upper portion 46 and a generally frustoconical lower portion 48 presenting a lower circular surface 50 having a diameter greater than the diameter of the cylindrical portion 46. The frustoconical lower portion 48 flares outwardly towards the first and second lower mold sections 30 and 32.

The longitudinal axis of the cylindrical portion 46 lies generally parallel with the parting plane P but offset therefrom. A portion of the frustoconical lower portion 48 extends beyond the edge of the top of the container mold cavity as indicated by arrow A in FIG. 4.

With reference to FIG. 4 and FIG. 5, it can be seen that the protuberance 44, at the top of the mold cavity, extends over a major portion of the mold cavity for forming a major portion of the top surface of the membrane 18. The parting line across the membrane 18 is thus formed by the circular arc of the bottom of the frustoconical portion 48 of the protuberance 44 which overlies the mold cavity.

The longitudinal axis of the protuberance 44 preferably lies on a longitudinal plane of symmetry S (FIG. 5), indicated in dashed line, which is perpendicular to the parting plane P. Thus, when viewing the protuberance 44 from a line of sight perpendicular to the parting plane P as in FIG. 6, the protuberance 44 is symmetrically aligned relative to the mold cavity.

Protuberance 44 is readily detachable from the second upper mold section 36 to permit easy cleaning, sharpening and/or replacement. Although the frustoconical portion 48 is shown as projecting into the mold section 36 at point A (FIG. 4), it is to be understood that the frustoconical portion 48 could instead be terminated at the edge of the mold cavity.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A mold assembly for molding a container from an extruded length of thermoplastic tubing and thereafter sealing the molded container, which assembly comprises:

a pair of movable, opposed lower mold sections each having a principal mold face defining a cavity adapted to shape a body portion of the container and a pair of movable opposed upper mold sections each having a principal mold face and adapted to shape a unitary flat, pierceable closure for the container;

said movable mold sections being positionable between an open mold position and a closed mold position and being adapted to receive between said principal mold faces said extruded length of thermoplastic tubing, and the principal mold faces of the lower mold sections together defining a central parting plane when the lower mold sections are in said closed mold position; and one of said pair of upper mold sections having a mold insert removably affixed on the principal mold face thereof for shaping at least a portion of said pierceable closure, said mold insert being a generally cylindrical member having a substantially flat base at one end adapted to shape a major portion of the exterior surface of said pierceable closure, and the other of said pair of upper mold sections having a recess complementary to said mold insert and adapted to mate with said mold insert when the upper mold sections are in said closed mold position;

whereby at least a portion of the resulting parting line on the closure of the molded container is displaced relative to said central parting plane by said removable mold insert.

2. The mold assembly in accordance with claim 1 wherein said base is of a generally circular configuration and has a diameter greater than the diameter of said cylindrical member.

3. In a mold assembly for molding and sealing a container from a tube of thermoplastic material, said container having a unitary, generally flat, syringe-pierceable, top closure surface; said mold assembly having a lower mold comprising first and second lower mold sections positionable relative to a central mold parting plane between an open mold position and a closed mold position for forming the container, said first and second lower mold sections defining a container mold cavity oriented generally symmetrically about said central mold parting plane when said first and second lower mold sections are in said closed position, the improvement which comprises:

said mold assembly further including an upper mold comprising first and second upper mold sections positionable relative to said central mold parting plane between an open mold position and a closed mold position for forming the top closure surface of the container in a generally circular configuration;

part of said first upper mold section terminating short of said central mold parting plane to define a recess in the first upper mold section above said container mold cavity defined by said lower mold sections when the mold sections are in the closed position;

said second upper mold section having a removable protuberance extending beyond said central parting plane and projecting over the container mold cavity defined by the lower mold sections when the mold sections are in the closed position, said protuberance having a base for forming a major portion of the container top closure surface, said protuberance being adapted to confront and be received within said recess of said first upper mold section when said mold sections are in the closed position, said removable protuberance including a generally cylindrical upper member and a frusto-conical lower member presenting a lower circular surface with a diameter greater than said cylindrical member; and said upper mold sections presenting mold surfaces for defining the top of the container mold cavity for forming said container top closure surface with the mold parting line thereon offset relative to said central mold parting plane by said removable protuberance.

4. The improvement in accordance with claim 3 in which the longitudinal axis of said cylindrical upper member is spaced from and parallel with said central parting plane and wherein a portion thereof extends outwardly beyond the periphery of the top of said container mold cavity.

* * * * *